July 26, 1966 W. H. HAINER 3,262,593
WALL-MOUNTED SUPPORT STRUCTURE
Filed July 10, 1963 6 Sheets-Sheet 1

FIG. 1

INVENTOR.
WILLIAM H. HAINER
BY
ATTORNEY

July 26, 1966

W. H. HAINER 3,262,593

WALL-MOUNTED SUPPORT STRUCTURE

Filed July 10, 1963

INVENTOR.
WILLIAM H. HAINER
BY
*L. MacRoy Lillehaugen*
ATTORNEY

INVENTOR.
WILLIAM H. HAINER
BY
ATTORNEY

United States Patent Office 3,262,593
Patented July 26, 1966

3,262,593
WALL-MOUNTED SUPPORT STRUCTURE
William H. Hainer, St. Paul, Minn., assignor to General Mills, Inc., a corporation of Delaware
Filed July 10, 1963, Ser. No. 294,040
9 Claims. (Cl. 214—651)

This invention pertains to a support structure, and more particularly to a wall-mounted support structure supported on horizontal rails attached to a vertical wall. The support structure is constructed so that it will position and maintain a crane hoist system, a mechanical arm manipulator system, or other material handling system, at a desired position with respect to a work piece or load.

The use of mechanical arm manipulators for remote handling of substances or objects in uninhabitable environments, such as areas that are radioactive, toxic, high and low temperature, or vacuum in nature, is well known to those skilled in the art. Manipulators of this type are most commonly attached to an overhead bridge system which is adapted to move along a rail system. Manipulators have in the past, also been attached to a bridge or mast which is mounted for movement along a vertical wall-mounted rail system, as well as to a vehicle which is freely movable about the work area. In remotely controlled manipulator systems of this type, the actions to be performed by the manipulator can be done only when the manipulator arm is securely mounted to a stable platform which can take the reactive forces exerted against the manipulator system when work operations are being performed by the manipulator.

Several factors must be considered when a wall-mounted manipulator system is used. One important factor which must be taken into consideration concerns the reactive force exerted against the support structure and the wall connection when the manipulator system is being used; for example, when the manipulator is extended along its longitudinal axis, when it is pivoted in a horizontal plane about an axis parallel to the wall, or when a load is hoisted, moments are created which might damage the material handling system, unless adequate reinforcements are provided. When the manipulator is pivoted in a horizontal plane for example, and the manipulative task involves handling a heavy object, considerable moments are imposed at the wall connection. As a result, a strong massive support structure which will support not only the manipulator itself, but also the load being handled is required, and it must be able to withstand the weights reflected back to the supporting structure which might result in a tremendous wall moment. One type of wall-mounted support structure known to those skilled in the art, includes a pair of horizontal rails which are attached to a vertical wall, and a frame or bridge attached to trolley wheels in such a manner that the trolley wheels can move along the horizontal rails. It has been found, however, that a couple parallel to the wall, created when certain manipulative tasks are performed, tends to spread the rails if the couple is allowed to be disposed through the wheels against the rails. Consequently, a reinforced support structure must be provided to prevent the rails from spreading.

Accordingly, one object of the present invention is to provide an improved wall-mounted support structure.

Another object is to provide a wall-mounted support structure supported on horizontal rails attached to a vertical wall, which is adapted to support and maintain a mechanical arm manipulator system at a desired position.

A further object is to provide a support structure adapted to be mounted for relative movement along a pair of horizontal rails, in such a manner that the rails will not tend to spread apart when a couple parallel to the wall, is exerted against the support structure.

A still further object is to provide a mechanism for use with a vertical bridge or mast supported on a vertical wall-mounted rail system, which will transmit moments placed on the bridge into the rail system without spreading the rails apart.

Another object is to provide a vertical bridge member, mounted on a pair of end trucks which are adapted to move along a horizontal rail system, which has no fixed frame between the bridge member and the end trucks.

A further object is to provide a vertical bridge member attached to a pair of end trucks, the bridge member being provided with an internal mechanism for driving the end trucks along a horizontal rail system.

Still another object is to provide a mechanism for use with a rail-mounted bridge member having a boom system attached thereto, which will transmit moments imposed on the bridge member by movement of the boom system through a horizontal plane, into the rail system.

Other objects and advantages of this invention will become apparent from a consideration of the following specification and drawings. Before proceeding with a detailed description of the invention however, a brief description of it will be presented.

Preferably, the support structure of the present invention is supported on lower and upper horizontal rail systems attached to a vertical wall; each rail system being provided with a gear rack attached to one surface. The structure includes a lower truck assembly, an upper truck assembly, and a vertical bridge member or mast rotatably connected at its ends to the truck assemblies; the truck assemblies being mounted for relative movement along the rails. A motor is provided for rotating the bridge member about its longitudinal axis, relative to the truck assemblies. A carriage mounted for relative movement along the vertical axis of the bridge member is provided, and it serves as a base for attaching a boom system to the support structure. An elongate squaring shaft is rotatably mounted within the bridge member and it is coaxial therewith. A system of spur gear assemblies operatively connects the squaring shaft to the gear racks attached to the rails. A motor is provided for rotating the squaring shaft about its axis; as the shaft is rotated, movement is imparted to the support structure along the rails. Moreover, the squaring shaft mechanism becomes loaded in torsion whenever a couple is present, and it is adapted to transmit moments placed on the bridge, which would tend to spread the rails, into the gear racks in such a manner that an axial load is placed along the rail system, and the tendency to spread the rails apart or damage the support structure is reduced.

The invention will best be understood by reference to the following drawings, wherein.

Figure 1:
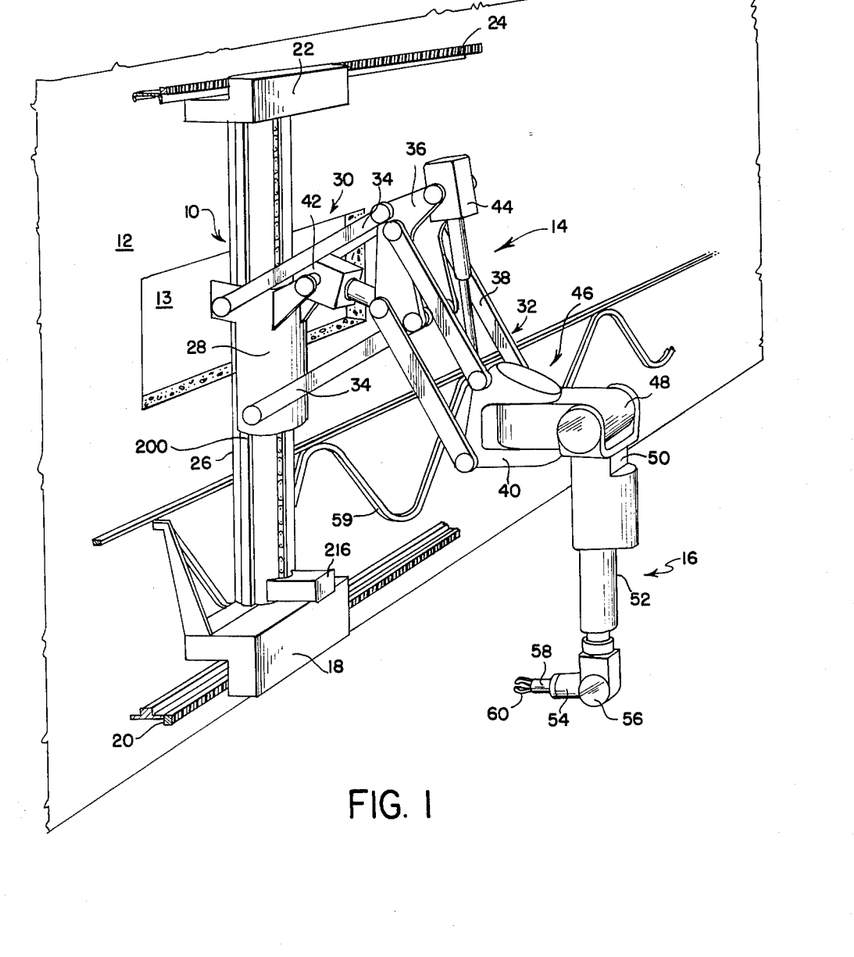
FIGURE 1 is a schematic perspective view illustrating a support structure supported on horizontal rail systems attached to a vertical wall, a boom system attached to the support structure, and a mechanical arm manipulator attached to the boom system.

FIGURE 1 illustrates a support structure designated generally by reference numeral 10, attached to a vertical cell wall 12. A window 13 is provided for the operator behind the wall 12 to view the work operations being performed. A boom system 14 is attached at one end to the support structure 10, and attached to the other end of the boom system is an articulated mechanical arm manipulator 16. The support structure includes a lower truck assembly 18 mounted for relative movement along a lower rail system 20, an upper truck assembly 22 mounted for relative movement along an upper rail system 24, and a bridge member or mast 26, rotatably connected at its two ends to the lower and upper truck assemblies. A carriage 28 is attached to the bridge 26 and it is adapted to move along the longitudinal axis of the bridge 26. The carriage 28 serves as a mounting base or platform for attaching the boom 14 to the support structure 10.

The boom system 14 is comprised of a first pantograph linkage 30 and a second pantograph linkage 32. The first pantograph linkage is formed from a framework of rods or arms 34 and an end frame 36. The arms 34 are attached at one end to the carriage 28 and at their second end to the end frame 36 in such a manner that a first parallelogram is formed. The second pantograph linkage 32 is likewise formed from a framework of rods or arms 38 and an end frame or yoke 40. The arms 32 are attached at one end to the end frame 36 and at their second end to the end frame or yoke 40 in such a manner that a second parallelogram is formed. A first actuator 42 is attached to the carriage 28 and it is operatively connected to the first end frame 36, so that when it is actuated, the first pantograph linkage can be pivoted relative to the carriage 28, and the end frame 36 is caused to pivot in a vertical plane about an axis perpendicular to the longitudinal axis of the bridge 26. A second actuator 44 is attached to the end frame 36 and it is operatively connected to the second end frame or yoke 40 so that when it is actuated, the second pantograph linkage can be pivoted relative to the end frame 36, and the end frame or yoke 40 is caused to pivot in a vertical plane about an axis perpendicular to the longitudinal axis of the bridge 26.

The manipulator 16 is attached to the boom system 14 by means of a universal joint 46 which includes the second end frame or yoke 40 and a support member 48. The support member 48 is pivotally connected to the yoke 40, and it is adapted to pivot about a vertical axis with respect to the yoke 40. The manipulator 16 includes a first portion or yoke 50 which is pivotally connected to the support member 48, and it is adapted to pivot or rotate about an axis normal to the pivotal axis of the support member 48 with respect to the yoke 40. The manipulator 16 also includes an upper arm 52 rotatably and reciprocally connected to the yoke member 50, and a lower arm 54 pivotally attached to the upper arm 52 thereby forming an elbow joint 56. A hand 58, having a grip mechanism 60, is rotatably connected to the lower arm 54. Manipulators of this general type are generally well known to those skilled in the art and will not be described in further detail. The various relative movements described above are accomplished by means of appropriate actuators (not shown in the drawings). It must be understood, that although a boom system comprised of pantograph linkages, has been described, other types of boom systems might be used as well; in addition, other types of manipulators might be used as well. For example, an elongate telescopic boom system, adapted to extend and retract along its longitudinal axis might be used in lieu of the pantograph linkages.

Various types of actuators might be used for imparting movement to the pantograph linkages as well as the other actuators used. It is envisioned for example, that hydraulic actuators might be used, electrical motors might be used, ball-screws might be used, or the like. Various types of actuators require the use of some type of cable system by which the current, fluid, or the like is transmitted to the actuator. A cable system 59 attached to the wall 12, supplies power to the various actuators, as the bridge assembly moves along the rail systems. This type of cable system is known to those skilled in the art and will not be described in detail.

Figure 2:
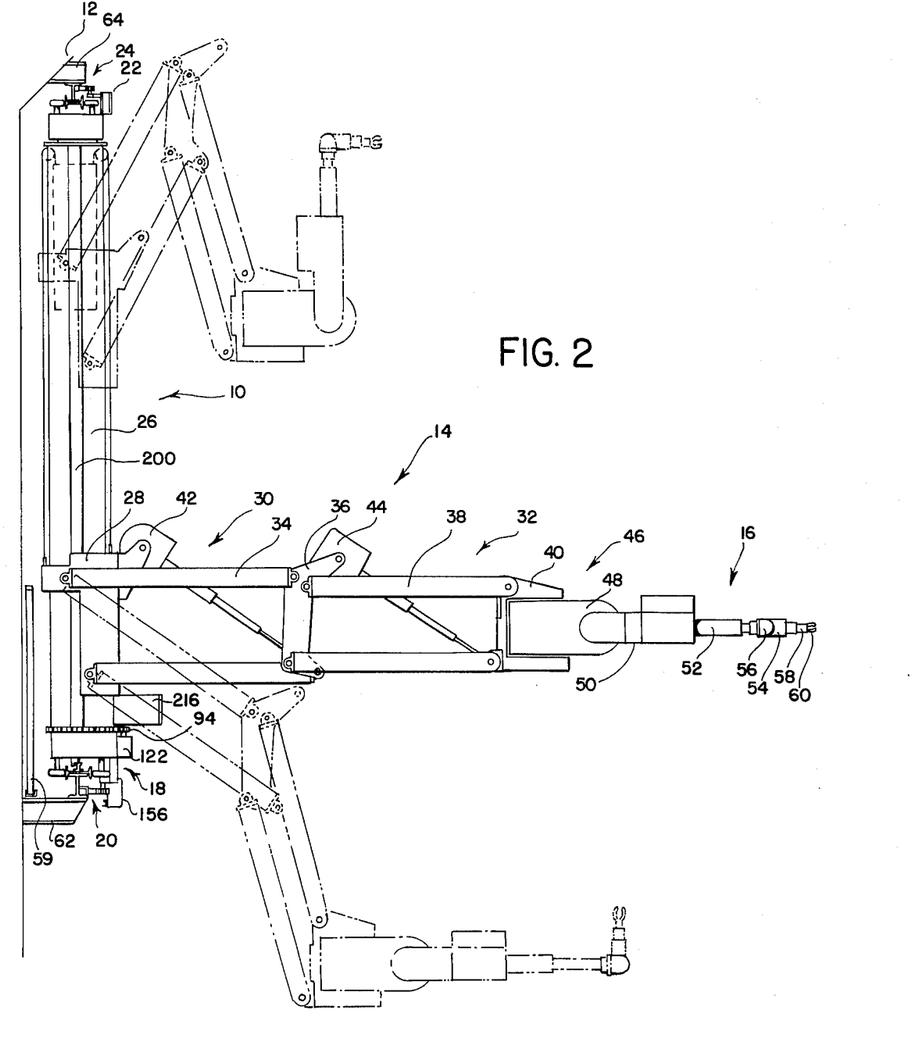
FIG. 2 is a side elevational view illustrating a structure similar to that depicted in FIG. 1 but in greater detail.

FIG. 2 illustrates the structure in somewhat greater detail. The support structure 10 is mounted on horizontal rail systems 20 and 24, and it is adapted to move in a horizontal direction along the wall 12. The lower rail system 20 is attached to the wall 12 by means of I-beams 62, and the upper rail system 24 is attached to the wall 12 by means of I-beams 64. FIG. 2 also illustrates the boom system and the manipulator in different operating conditions, as shown by the broken lines.

When the system is in operation, and manipulative tasks are being performed, heavy loads are often handled by the manipulator and moved about the work area. As the load is handled, a reactive force is exerted against the support structure 10 and the rail systems 20 and 24. For example, when the bridge member 26 and the boom system 14 are pivoted about the longitudinal axis of the bridge relative to the end truck assemblies 18 and 22, and a load or object is being carried or handled by the manipulator 16, the total weight might be of such magnitude that a couple, parallel to the wall, would tend to spread the rails if it was allowed to be disposed on to the top surface of the bottom rail system 20 and the bottom surface of the upper rail system 24. The present invention provides a mechanism which transmits the couple into the rail systems 20 and 24 in such a manner that axial loads are placed along the rail systems and they are not caused to separate with respect to each other. Generally, this mechanism includes an elongate squaring shaft 70 rotatably mounted within the bridge 26 and coaxial therewith, and a gearing arrangement which operatively connects the shaft 70 to the rails 20 and 24. In this connection, note FIGS. 3–5 which illustrate the bridge 26 and the elongate squaring shaft 70 in assembled relationship. This mechanism will be described in greater detail hereinafter.

FIGS. 6–10 illustrate the lower truck assembly 18 and the lower rail system 20 in greater detail. The rail system 20 is formed from a number of I-beams which are positioned with respect to each other to provide a plurality of surfaces. Note specifically FIGS. 6, 8, and 9 in this connection. The lower rail system includes a first elongate I-beam 74 having its longitudinal axis extending in a horizontal direction, parallel to the surface of the vertical wall. The I-beam 74 is positioned on and attached to a plurality of the I-beams 62 so that an axis extending through the beam web 75 extends vertically. The I-beams 62 are attached to the wall 12 so that they extend perpendicularly away from the wall 12. A second elongate I-beam 78 is positioned on the flange portion 76 of the I-beam 74 in such a manner that an axis extending through the beam web 77 is normal to the axis of the beam web 75, and the flange portions 79 straddle the flange 76. A third I-beam 80 is positioned on the web 77 of the I-beam 78, so that an axis through the beam web 81 is parallel to the axis of the web 75. Attached to one side of the I-beam 74 is an L-shaped frame 82 which has attached thereto a gear rack 84. All the I-beams, with the exception of the support I-beam 62, have their longitudinal axes extending horizontally along the wall 12, and together, they provide a rail system along which the lower truck assembly 18 is adapted to move with respect to the wall.

Figure 8:
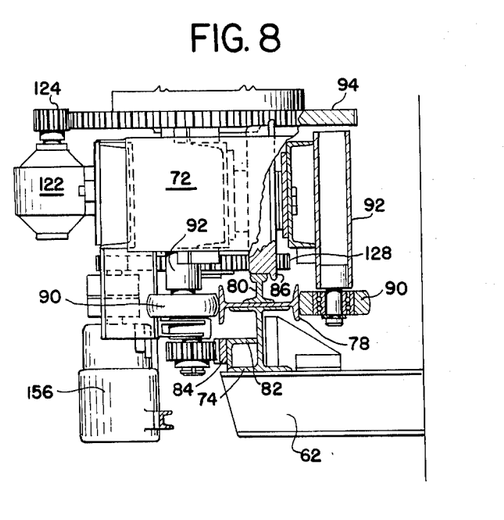
FIG. 8 is a side elevational view of the lower truck assembly shown in FIG. 6.
Figure 9:
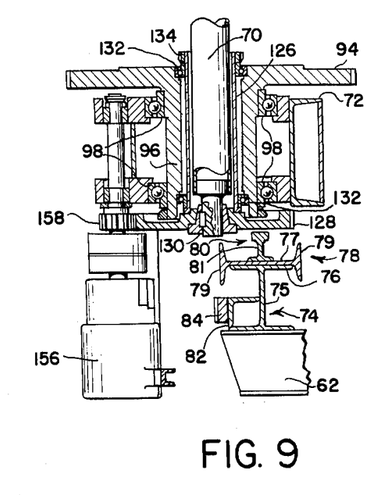
FIG. 9 is a partial sectional view taken along line 9—9 of FIG. 6.
Figure 10:
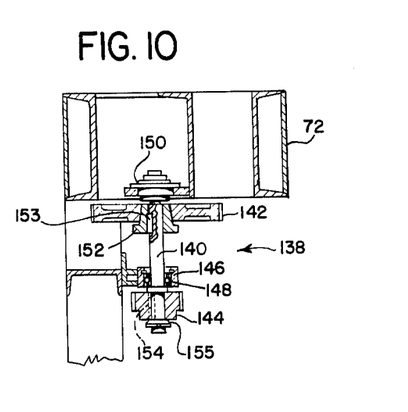
FIG. 10 is a partial sectional view taken along line 10—10 of FIG. 6.
Figure 11:
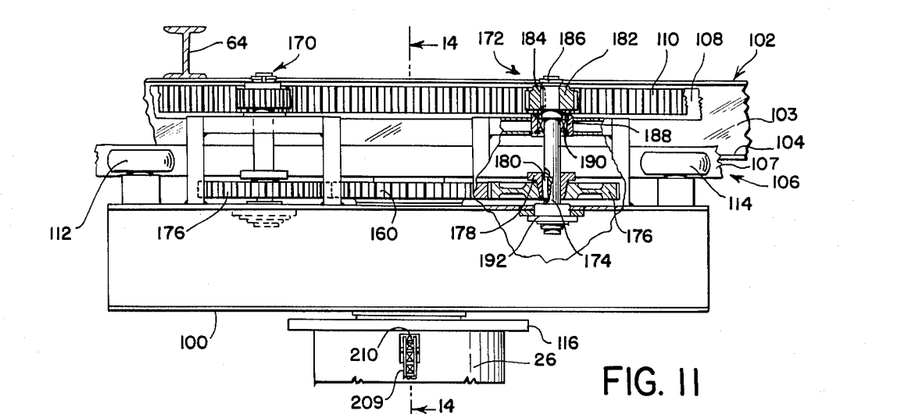
FIG. 11 is a partial front elevational view illustrating the upper truck assembly.
Figure 12:
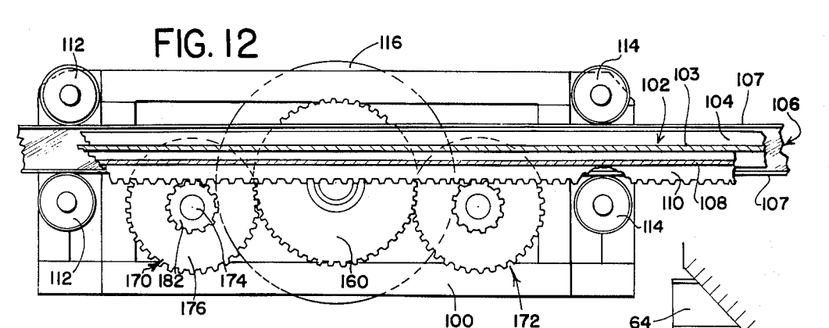
FIG. 12 is a top view of the upper truck assembly shown in FIG. 11, taken along line 12—12 of FIG. 13.
Figure 13:
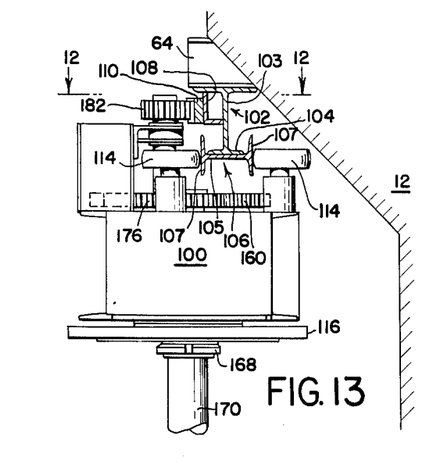
FIG. 13 is a side elevational view of the upper truck assembly shown in FIG. 11.
Figure 14:
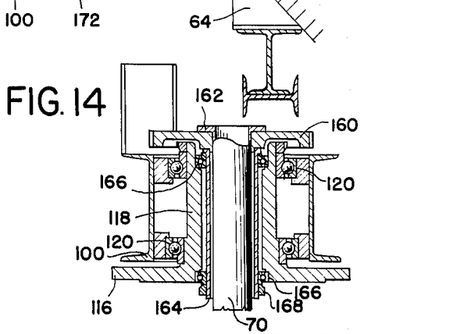
FIG. 14 is a partial sectional view taken along line 14—14 of FIG. 11.

The lower truck assembly 18 includes a frame 72 mounted for relative movement along the rail system 20. A pair of trolley wheels 86 are rotatably mounted in the frame 72 in such a maner that they ride on the I-beam 80. Mounted at each end of the frame 72 are two pairs of rollers 88 and 90. As shown in FIG. 8, each roller is supported by a tubular member 92 which positions the rollers with respect to the I-beam 78 so that one roller of each pair contacts and moves along flanges 79 of the I-beam 78. The rollers 88 and 90 help prevent the truck assembly 18 from sliding off the rail system 20, and they restrain the bridge from tilting in a direction normal to the wall.

FIGS. 11-14 illustrate the upper truck assembly 22 and the upper rail system 24 in greater detail. The upper rail system 24 is formed from a number of I-beams similar to those described above in connection with the lower rail system 20. The upper rail system 24 includes a first elongate I-beam 102 having its longitudinal axis extending in a horizontal direction, parallel to the surface of the vertical wall. The I-beam 102 is attached to the wall 12 by means of a plurality of the support I-beams 64, which extend perpendicularly away from the wall 12, so that an axis through the beam web 103 extends vertically. A second elongate I-beam 106, is secured to the flange portion 104 of the I-beam 102 so that an axis through its beam web 105 is normal to the axis of the web 103, and its flanges 107 straddle the flange 104. An L-shaped member 108 is attached to one side of the I-beam 102 and it has secured thereto a gear rack 110.

The upper truck assembly includes a frame 100 which is mounted for relative movement with respect to the upper rail system 24 in a manner somewhat similar to the lower truck assembly 18 mounted relative to the lower rail system 20. Note however, that no trolley wheels, similar to the trolley wheels 86 mounted in the frame 72, are provided. A first pair of rollers 112 are rotatably mounted at one end of the upper frame 100, and a second pair of rollers 114 are mounted at the second end of the end frame, in such a manner that the flanges 107 of the I-beam 106 are disposed between the rollers of each pair. As the upper truck assembly 22 moves relative to the rail system 24, the rollers 112 and 114 roll along the flanges of the I-beam 106, and they help to prevent the truck assembly 22 from sliding off the rail system 24, and they restrain the bridge from tilting in a direction normal to the wall.

Referring again to FIG. 3, the bridge member 26 is attached to the truck assemblies 18 and 22 by a pair of gear arrangements. The lower end of the bridge 26 is secured to a spur gear 94 which includes an integral sleeve portion 96. The sleeve 96 is rotatably mounted relative to the frame 72 by means of bearings 98, note FIG. 9. The upper end of the bridge 26 is secured to a circular plate 116 which includes an integral sleeve portion 118. The sleeve 118 is rotatably mounted relative to the frame 100 by means of bearings 120, note FIG. 14. The bridge member 26, therefore connects the lower and upper truck assemblies together, and as the lower truck assembly moves relative to its rail system 20, the upper truck assembly is likewise caused to move along its rail system 24. The bridge 26 is adapted to rotate about its longitudinal axis with respect to the lower and upper truck assemblies, by virtue of the bearings 98 and 120 respectively. A motor 122, which is secured to the lower frame 72 by appropriate means, is provided with a pinion 124 which meshes with the spur gear 94. When the motor 122 is energized, the bridge 26 is caused to rotate about its longitudinal axis relative to the frames 72 and 100.

Figures 3, 4, 5:
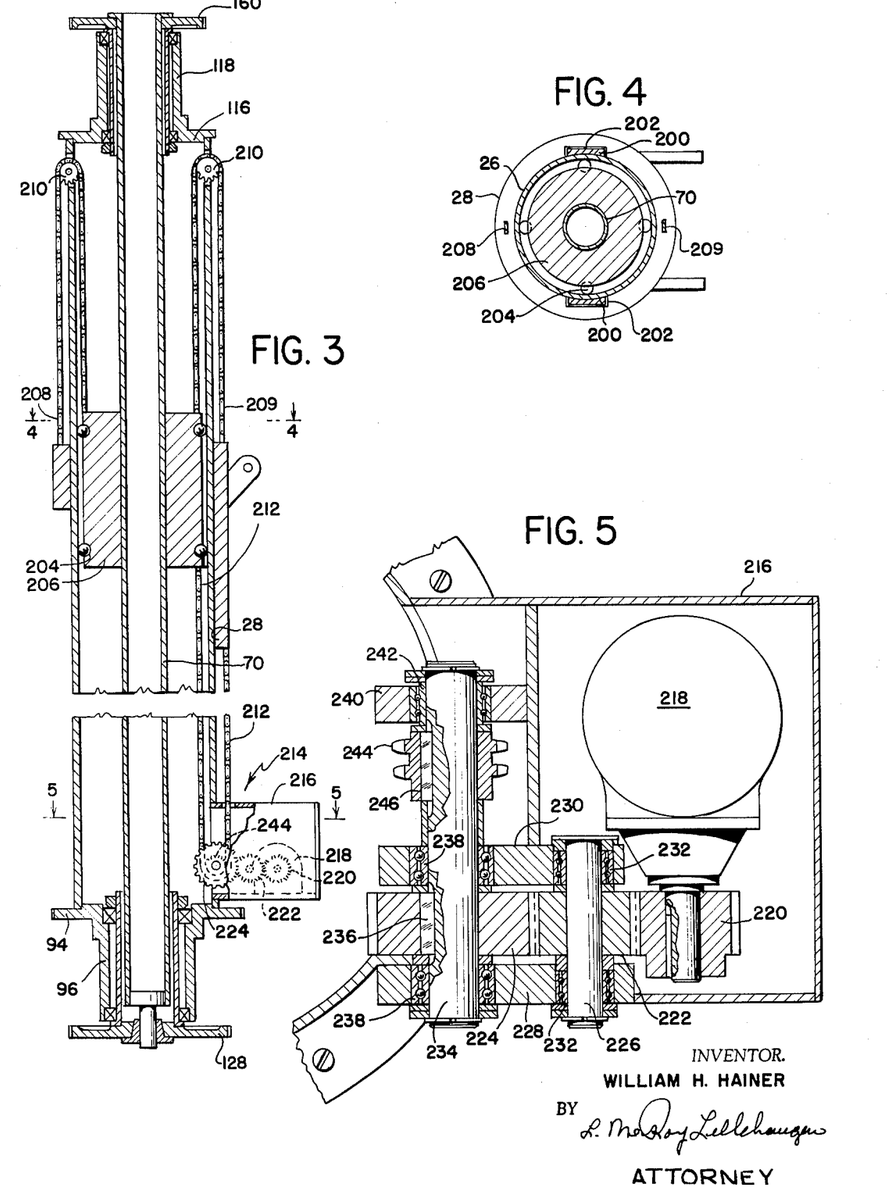
FIG. 3 is a partial sectional view illustrating the bridge member and an elongate squaring shaft.
FIG. 4 is a sectional view taken along the line 4—4 of FIG. 3.
FIG. 5 is an enlarged sectional view taken along line 5—5 of FIG. 3.
Figure 6:
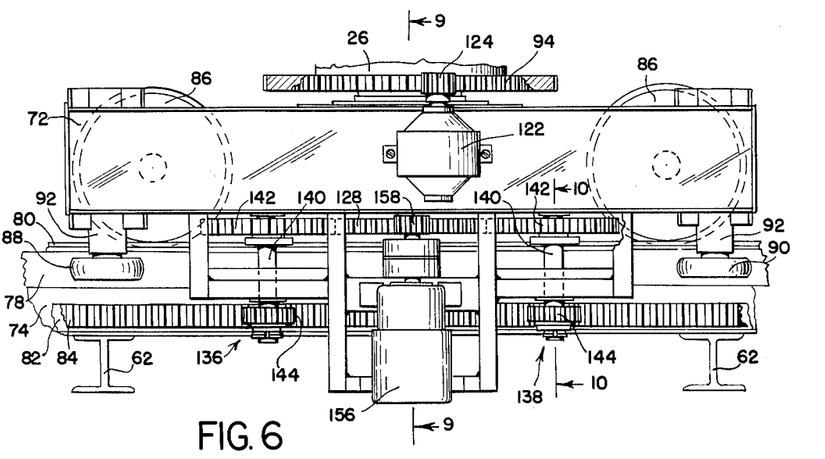
FIG. 6 is a partial front elevational view illustrating the lower truck assembly.
Figure 7:
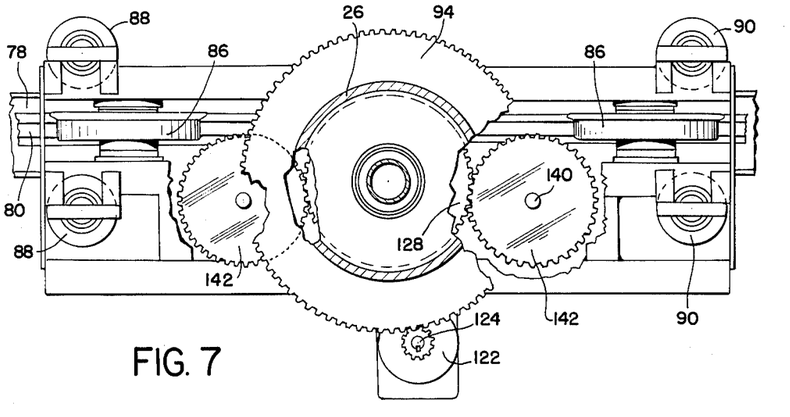
FIG. 7 is a top plan view of the lower truck assembly shown in FIG. 6.

A tubular elongate squaring shaft 70 is disposed within the bridge member 26 and is coaxial therewith. The shaft 70 is adapted to withstand a certain amount of torque.

It should be understood of course, that if desired, the squaring shaft 70 might be solid as well. The lower end of the squaring shaft 70 is fixedly secured to a spur gear 128 by means of a hub 130. The spur gear 128 in turn is fixedly attached to a sleeve 126, e.g. by welding. The sleeve 126 is disposed within the sleeve 96 and it is rotatably mounted with respect to the sleeve 96 and the spur gear 94 by means of bearings 132. The sleeve 126 is attached to the spur gear 94 by means of a lock-nut and washer assembly 134. The assembly 134 maintains the lower portion of the squaring shaft 70 in fixed axial relationship with respect to the spur gear 94, and more particularly, the lower frame 72 and the lower truck assembly 18.

A pair of gear assemblies 136 and 138 are mounted relative to the frame 72 in such a manner that they are disposed on opposite sides of the spur gear 128. Each gear assembly includes a shaft 140, and a first spur gear 142 fixedly attached near one end of the shaft, and a second spur gear 144 fixedly attached to the other end of the shaft 140. In this connection note FIG. 10 which illustrates the gear assembly 138 in greater detail. The shaft 140 is rotatably mounted with respect to the end frame 72 by means of a support bracket 146 and a bearing 148. The upper end of the shaft 140 is secured to the frame 72 by means of a flanged pillow block 150. The spur gear 142 is fixedly attached to the shaft 140 by means of a hub 152 and a key 153, and the spur gear 144 is fixedly attached to the shaft 140 by means of a key 154 and a lock nut 155. The gear assemblies 136 and 138 are substantially identical, and are mounted on the end frame 72 in such a manner that the spur gears 142 mesh with the spur gear 128, and the spur gears 144 mesh with the gear rack 84. The squaring shaft 70 and the gear assemblies which mesh with the gear rack 84, oppose tilting of the bridge in a direction parallel to the wall. The squaring shaft 70 and the spur gear 128 are caused to rotate about the longitudinal axis of the squaring shaft by means of a motor 156 and a drive pinion 158 attached to the motor 156, the pinion 158 being adapted to mesh with the spur gear 128. As the squaring shaft 70 is rotated, it transmits driving torque to the upper truck assembly 22.

The upper end of the squaring shaft 70 is secured to a spur gear 160 at 162 by appropriate means, such as bolting or welding. The spur gear 160 in turn is fixedly attached to a sleeve 164, and the sleeve 164 is rotatably mounted within the sleeve portion 118 by means of bearings 166. The sleeve 164 is attached to the plate 116 by means of a lock-nut and washer assembly 168. As the spur gear 128 is caused to rotate by meshing engagement with the motor 156, the spur gear 160 is likewise caused to rotate about the longitudinal axis of the squaring shaft 70 in the same direction as the direction of rotation of the spur gear 128.

Two gear assemblies 170 and 172 are secured to the upper frame 100 in such a manner that they are disposed on opposite sides of the spur gear 160, in a manner similar to that described above regarding the gear assemblies 136 and 138. Each of the gear assemblies 170 and 172 includes a shaft 174, a first spur gear 176 attached near one end of the shaft 174 by means of a hub 178 and a key 180, and a second spur gear 182 attached to the opposite end of the shaft 174 by means of a key 184 and a lock nut 186. In this connection, note FIGURE 11. Each of the gear assemblies is connected to the upper frame 100 by means of a support bracket 188 and a bearing 190. The lower end of the shaft 174 is secured to the frame 100 by means of a flanged pillow block 192. Each of the gear assemblies is positioned so that the spur gear 176 meshes with the spur gear 160 attached to the squaring shaft 70, and the spur gear 182 meshes with the gear rack 110 attached to the upper rail system 24. The squaring shaft 70 and the gear assemblies 170 and 172 which mesh with the gear rack 110, oppose tilting of the bridge in a direction parallel to the wall.

The carriage 28 is mounted on the bridge 26 in such a manner that it is adapted to move along the longitudinal axis of the bridge 26. The bridge is provided with at least two guide rails 200 attached to its outer surface in such a manner that they extend along the longitudinal axis of the bridge 26, the carriage 28 on the other hand is provided with accommodating recesses 202. The guide rails 200 and the recesses 202 permit the carriage 28 to slide relative to the bridge 26, but they prevent the carriage from rotating relative to the bridge, about the longitudinal axis of the bridge, note FIGURES 3–5.

The carriage 28 is caused to move along the longitudinal axis of the bridge by means of a drive assembly which includes a counterweight 206 slidably disposed within the bridge member 26. Rollers 204 aid in moving the counterweight 206 relative to the interior surface of the bridge 26. The weight of the counterweight is of sufficient magnitude so that preferably it weighs at least as much as the boom system 14, the manipulator 16, and a partial load, thereby aiding in balancing the system. The counterweight 206 is operatively connected to the carriage 28 by means of chains 208, 209, and 212. The chains 208 and 209 are connected at one end to the top surface of the counterweight 206, by appropriate means, and at their other end to the carriage 28. Each chain partially encircles a pulley 210, rotatably mounted in the bridge member 26. The chain 212 is connected at one end to the bottom surface of the counterweight 206 by appropriate means, and at its other end to the carriage 28. The chain 212 is operatively connected to a carriage hoist system designated generally by reference numeral 214. In this connection it must be realized that although the use of chains is described herein, other types of connections such as cables, ball screws, or the like might be used as well.

The carriage hoist system includes a housing 216 secured to the bottom end of the bridge 26 in such a manner that it is adapted to rotate about the longitudinal axis of the bridge when the bridge is rotated. Positioned within the housing 216 is a drive motor 218 having a drive pinion 220 keyed onto its output shaft, an idler pinion 222, and a spur gear 224. The idler pinion 222 is mounted on a shaft 226 which is rotatably mounted in support members 228 and 230 by means of bearings 232. The spur gear 224 is fixedly attached to a shaft 234 by means of a key 236. The shaft 234 is rotatably mounted in the support members 228 and 230 by means of bearings 238, as well as in a support member 240 by means of a bearing 242. A sprocket 244 is fixedly attached to the shaft 234 by means of a key 246, and the chain 212 is partially encircled around the sprocket 244 in such a manner that the sprocket engages the chain links.

In operation, the multi-component manipulator 16 is positionable adjacent to a work piece, and it is adapted to perform numerous manipulative functions. The boom system 14 connects the manipulator 16 to the carriage 28 mounted on the vertical bridge 26, the latter in turn being mounted for relative horizontal movement along the vertical wall 12. As illustrated in FIGS. 1 and 2, the boom system 14 can be extended and retracted by actuating the actuators 42 and 44, thereby folding the pantograph linkages 30 and 32. The pantograph linkages 30 and 32 maintain the universal joint 46, and consequently the manipulator 16, at a constant attitude while either the linkage 30 or 32 is moved by its respective actuator 42 or 44.

The carriage 28 is movable along the longitudinal axis of the bridge 26 by the motor 218 positioned in the housing 216. By energizing the motor 218 the shaft 234 and the sprocket 244 are caused to rotate about the axis of the shaft 234. Rotation of the sprocket 244 causes the carriage 28, and the counterweight 206 positioned within the bridge 26, to move along the longitudinal axis of the bridge, by means of the chain 212 which is engaged by the sprocket 244. For example, when the sprocket 244 is rotated in a clockwise direction, as viewed in FIG. 3, the carriage 28 is pulled down, and the counterweight 206 is caused to move up by means of the chains 208 and 209 which are entrained over the pulleys 210, and which operatively connect the top of the counterweight 206 to the top of the carriage 28. Conversely, when the sprocket 244 is rotated in a counterclockwise direction, the counterweight 206 is pulled down, and the carriage 28 is caused to move up. Thus the boom system 14 and the manipulator 16 can be raised and lowered along the longitudinal axis of the bridge 26.

By energizing the motor 122, the bridge 26 can be pivoted about its longitudinal axis. As noted for example in FIGS. 6 and 7, the pinion 124 meshes with the spur gear 94; as the motor 122 is energized, the pinion 124 drivingly engages the spur gear 94, thus pivoting the bridge 26 about its longitudinal axis. Pivotal movement of the bridge 26 in this manner, causes the boom system 14 and the manipulator 16 to swing through a horizontal plane, thereby circumscribing an arc about the bridge axis. By pivoting the bridge 90° in either direction from that shown in FIG. 2, the boom system 14 can be positioned relative to the wall 12 so that it extends substantially parallel to the wall 12.

The bridge 26, the lower truck assembly 18, and the upper truck assembly 22 are moved along the lower and upper rail systems by energizing the motor 156. The drive pinion 158 meshes with the spur gear 128, and it causes the gear 128 to rotate about its axis. As noted above, the spur gear 128 meshes with the spur gears 142, thereby causing them to rotate in a counter direction relative to the spur gear 128, but in the same direction relative to each other. Rotation of the spur gears 142 causes the shafts 140, and the spur gears 144 to rotate about the axis of the shafts 140. Since the spur gears 14 engage the gear rack 84, the lower truck assembly 18 is caused to move along the lower rail system 20. The squaring shaft 70, which is secured to the spur gear 128, likewise rotates about its axis when the spur gear 128 is rotated, and it causes the spur gear 160 to rotate in the same direction. The spur gears 176, which are fixedly connected to the shaft 174, mesh with the spur gear 160 in the same manner as the meshing engagement of the spur gear 128 with the spur gears 142. The spur gears 182, which are also fixedly connected to the shaft 174, are caused to rotate when the shafts 174 rotate, and since they engage the gear rack 110, the upper truck assembly 22 is caused to move along the upper rail system 24 when the squaring shaft 70 rotates and the lower truck assembly 18 moves along the lower rail system 20.

The support structure, which includes the bridge 26, the truck assemblies 18 and 22, as well as the squaring shaft 70 and the rail systems 20 and 24, facilitates manipulative tasks and the handling of heavy objects by the manipulator 16 without exerting damaging reactive moments against the support structure and the wall connection. The squaring shaft, the gear racks attached to the rail systems, and the gear assemblies which operatively connect the squaring shaft to the gear racks, transmit moments placed on the bridge, parallel to the wall, created for example by the movement of the boom system 14 through a horizontal plane by pivoting the bridge 26 about its longitudinal axis, into the gear racks 84 and 110, thereby placing axial loads along the rail systems. The squaring shaft 70 becomes loaded in torsion whenever a couple is present, and it prevents damage to the support structure, and its connection to the wall. On the other hand, if the couple was allowed to be disposed through the trolley wheels onto the rail systems, there would be a tendency to spread the lower and upper rails apart relative to each other, and unless adequate reinforcing supports were provided for maintaining the rails connected to the wall and the bridge relative to the rails, the material handling system might be seriously damaged.

In the above description and the attached drawings, a disclosure of the principles of this invention is presented, together with some of the embodiments by which the invention may be carried out.

What is claimed is:

1. A wall-mounted support structure comprising an upper and a lower horizontal rail, means for attaching each rail to the wall, each rail having a gear rack thereon, a vertical bridge member, a lower truck assembly mounted for relative movement along the lower rail, an upper truck assembly mounted for relative movement along the upper rail, means for rotatably attaching one end of the bridge member to the lower truck, means for rotatably attaching the other end of the bridge member to the upper truck, a carriage mounted for vertical movement relative to the bridge member, an elongate shaft rotatably mounted within the bridge member and coaxial therewith, gearing means attached to each end of the shaft, means including said gearing means for operatively connecting said shaft to the gear racks on each rail, said means and said shaft adapted to transmit moments placed on the bridge member into the gear racks so that an axial load is placed along the rails, said moments having at least a component which acts in a direction substantially parallel to the wall, and means for rotating said shaft thereby moving the bridge member and the trucks relative to the rails.

2. A wall-mounted support structure comprising upper and lower parallel horizontal rails, each rail provided with a gear rack, a vertical bridge member, a carriage mounted on said bridge member, a lower truck assembly mounted on said lower rail, means for maintaining said lower truck assembly positioned relative to the lower rail, an upper truck assembly mounted relative to said upper rail, means for maintaining said upper truck assembly positioned relative to the upper rail, means for rotatably connecting the ends of said bridge member to the truck assemblies, an elongate squaring shaft, means for rotatably mounting said shaft within the bridge member so that it is coaxial with the bridge member, gearing means operatively connecting each end of said shaft to the gear racks on the rails, said shaft and said gearing means adapted to transmit moments placed on the bridge member into the gear racks so that an axial load is placed along the rails, which moments include at least a component substantially parallel to the wall, and means for rotating said shaft about its axis, said rotation causing the bridge member and the truck assemblies to move along said rails.

3. The combination of claim 2 wherein means is provided for rotating the bridge member about its longitudinal axis, relative to the truck assemblies.

4. The combination of claim 2 wherein means is provided for moving the carriage along the longitudinal axis of the bridge member.

5. The combination of claim 4 wherein the means for moving the carriage relative to the bridge member includes a counterweight disposed within the bridge member, said counterweight adapted to move axially within said bridge member, and means is provided for operatively connecting said counterweight to the carriage.

6. A wall-mounted support structure supported on lower and upper horizontal rail systems attached to a vertical wall comprising a vertical bridge member, a carriage movably mounted on said bridge member, a lower truck assembly, said truck assembly including a frame and at least one trolley rotatably mounted in said frame, means for maintaining said lower truck assembly on the lower rail system so that said trolley is positioned on a portion of said rail system, means for rotatably connecting the bridge member to the lower truck assembly, an upper truck assembly, said upper truck assembly including a frame, means for mounting said upper truck assembly relative to the upper rail so that it is adapted to move in a horizontal direction along said rail, means for rotatably connecting the bridge member to the upper truck assembly, a gear rack attached to each rail, an elongate squaring shaft, means for rotatably mounting said squaring shaft within the bridge member so that it is coaxial with the bridge member, both ends of said shaft projecting out of said bridge member, a spur gear attached to each end of the squaring shaft, means including said spur gears for operatively connecting said squaring shafts to each of the gear racks, said squaring shaft becoming loaded in torsion when a moment is exerted against the bride member, said moment having at least a component which is substantially parallel to the wall, said shaft and said means adapted to transmit said moment into the rail systems so that an axial load is placed along said rail systems, and means for rotating said squaring shaft about its axis, said rotation causing the bridge member and the truck assemblies to move along the rail systems.

7. The combination of claim 6 wherein the means for maintaining the lower truck assembly on the lower rail system includes at least two rollers, said rollers mounted on the truck assembly so that they contact opposite sides of the lower rail system, and the means for mounting the upper truck assembly relative to the upper rail system includes at least two rollers, said rollers mounted on the upper truck assembly so that they contact opposite sides of the upper rail system.

8. The combination of claim 6 wherein the means for operatively connecting the squaring shaft to the gear racks including a pair of gear assemblies mounted on each truck assembly on opposite sides of the squaring shaft, each assembly including a shaft and a spur gear attached to each end of said shaft, one of said spur gears mounted for meshing engagement with the spur gear connected to the squaring shaft and the other spur gear mounted for meshing engagement with the gear rack on the rails, said squaring shaft and said gear assemblies adapted to transmit moments placed on the bridge member into the gear racks.

9. A wall-mounted support structure supported on lower and upper horizontal rail systems attached to a vertical wall comprising a vertical bridge member having a longitudinal axis, a carriage, means for mounting said carriage on said bridge member for longitudinal movement along said bridge member, an articulated manipulator assembly, means for attaching said manipulator to the carriage, a lower truck assembly, said truck assembly including a frame and a pair of trolleys rotatably mounted in said frame, means for mounting said lower truck assembly on a portion of the lower rail system so that said trolleys are positioned on and adapted to move along said rail system, means for rotatably connecting the bridge member to the lower truck assembly, an upper truck assembly, said upper truck assembly including a frame, means for mounting said upper truck assembly relative to the upper rail system so that it is adapted to move in a horizontal direction along said rail system, means for rotatably connecting the bridge member to the upper truck assembly, means for maintaining said truck assemblies positioned relative to said rail systems, means for rotating said bridge member about its longitudinal axis, a pair of gear racks, means for attaching a gear rack to each rail system, an elongate squaring shaft, means for rotatably mounting said squaring shaft within the bridge member so that it is coaxial with the bridge member and its ends project out of said bridge member, a spur gear attached to each end of the squaring shaft, means including said spur gears for operatively connecting said shaft to each of the gear racks, said means including a pair of gear assemblies mounted on each truck assembly on opposite sides of the squaring shaft, each assembly including a shaft and a pair of spur gears, said spur gears attached to opposite ends of the shaft, one of said gears adapted to mesh with the spur gear on the squaring shaft, and the other spur gear of said gear assembly adapted to mesh with the gear rack on the rails, said squaring shaft and spur gear assemblies adapted to transmit moments placed on the bridge member into the horizontal rail systems without tending to spread the rail systems apart with respect to each other, said moments including at least a component substantially parallel to the wall.

References Cited by the Examiner

UNITED STATES PATENTS

| | | | |
|---|---|---|---|
| 329,219 | 10/1885 | Samuel | 212—17 |
| 638,080 | 11/1899 | Treadway | 187—7 X |
| 1,554,584 | 9/1925 | Lake. | |
| 2,822,094 | 2/1958 | Greer. | |

HUGO O. SCHULTZ, *Primary Examiner.*

R. G. SHERIDAN, *Assistant Examiner.*